(12) United States Patent
Cope

(10) Patent No.: US 9,031,607 B1
(45) Date of Patent: May 12, 2015

(54) UTILIZING SIGNAL POWERS ASSOCIATED WITH MULTIPLE CHANNELS OF A MOBILE DEVICE TO FACILITATE NETWORK SELECTION

(71) Applicant: Sprint Communications Company L.P., Overland Park, KS (US)

(72) Inventor: Warren Bruce Cope, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 187 days.

(21) Appl. No.: 13/780,638

(22) Filed: Feb. 28, 2013

(51) Int. Cl.
*H04B 7/208* (2006.01)
*H04W 48/18* (2009.01)
*H04W 76/02* (2009.01)
*H04W 24/02* (2009.01)

(52) U.S. Cl.
CPC .............. *H04W 48/18* (2013.01); *H04W 24/02* (2013.01); *H04W 76/028* (2013.01)

(58) Field of Classification Search
USPC ................ 455/418, 62, 517, 421, 436, 452.2, 455/67.11, 101, 103, 456.3, 115.3; 370/203, 431, 329, 328, 310, 330, 343, 370/295, 280, 324
See application file for complete search history.

(56) References Cited

U.S. PATENT DOCUMENTS

| 2010/0246481 A1* | 9/2010 | Aggarwal et al. ............. 370/328 |
| 2012/0021707 A1* | 1/2012 | Forrester et al. ............. 455/103 |
| 2012/0207085 A1* | 8/2012 | Guguen et al. ................ 370/324 |
| 2012/0309371 A1* | 12/2012 | Yamada ..................... 455/414.2 |

* cited by examiner

*Primary Examiner* — Ganiyu A Hanidu

(57) ABSTRACT

Systems, methods, and computer-readable media, for facilitating selection of networks are provided. In some embodiments, the method includes receiving at a user device a first signal via a first channel of a MIMO-enabled network and a second signal via a second channel of the MIMO-enabled network. A first power associated with the first signal and a second power associated with the second signal are identified. The first power associated with the first channel and the second power associated with the second channel are used to determine an undesired connection of the user device with the MIMO-enabled network.

19 Claims, 5 Drawing Sheets

UTILIZING SIGNAL POWERS ASSOCIATED WITH MULTIPLE CHANNELS OF A MOBILE DEVICE TO FACILITATE NETWORK SELECTION

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, facilitating selection of a wireless telecommunications network for utilization by a mobile device. Utilizing embodiments hereof, powers associated with signals received at a mobile device via multiple channels can be analyzed to determine whether a MIMO-enabled network is a preferred network for usage by the mobile device. In this way, a power of a signal(s) received through one channel can be compared to a power of a signal(s) received through another channel to assess signal strength and/or distance of a mobile device in association with a MIMO-enabled network, or a portion thereof.

BRIEF DESCRIPTION OF THE DRAWINGS

Illustrative embodiments of the present invention are described in detail below with reference to the attached drawing figures, and wherein.

DETAILED DESCRIPTION

Figure 1:
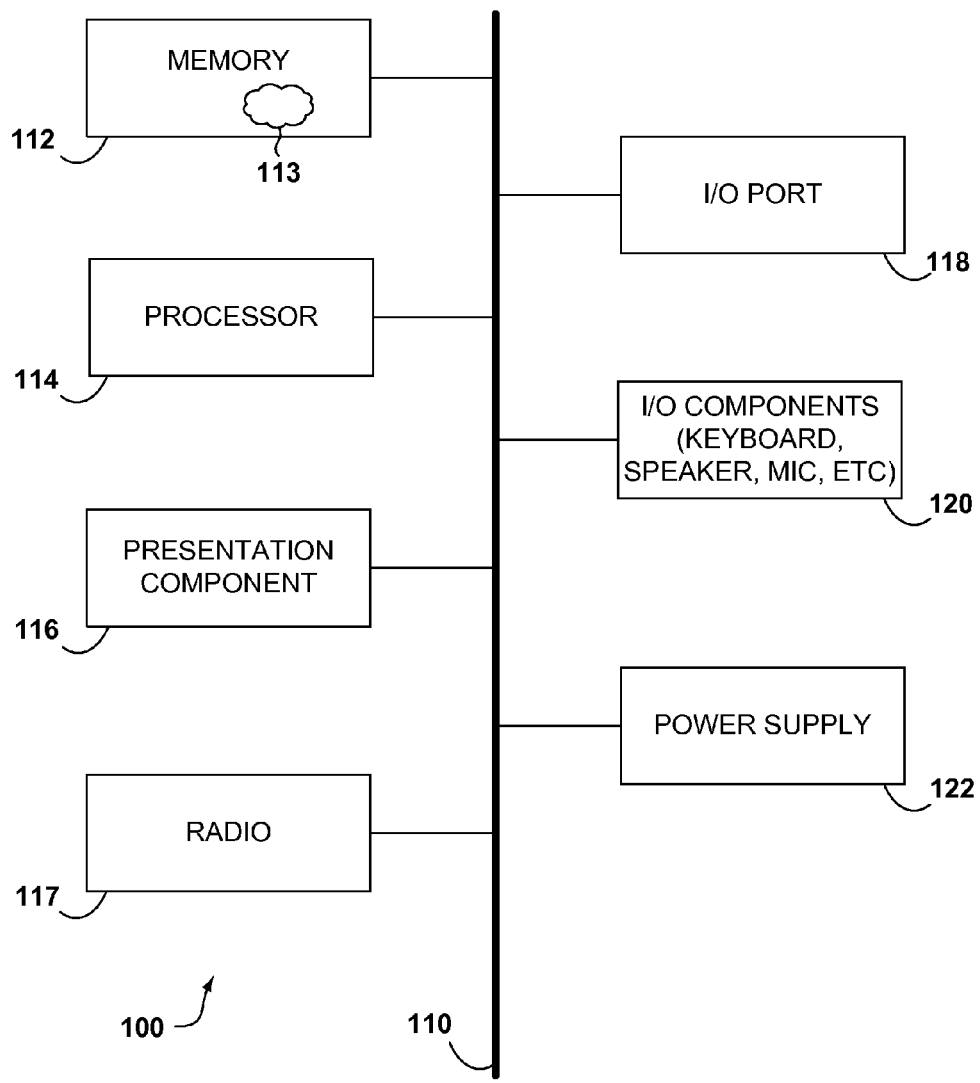
FIG. 1 depicts an exemplary computing device according to embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer-readable media for facilitating selection of a wireless telecommunications network for utilization by a mobile device. Utilizing embodiments hereof, powers associated with multiple signals received by a mobile device via multiple channels can be assessed to facilitate selection of a wireless telecommunications network to be used by the mobile device, as described in more detail below. In particular embodiments, a power of a signal(s) received at a mobile device through one channel can be compared to a power of a signal(s) received at a mobile device through another channel to assess signal strength and/or distance of a mobile device in association with a MIMO-enabled network, or a portion thereof.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Technology
4G Fourth-Generation Cellular Communication System
BSC Base Station Controller
CD-ROM Compact Disk Read Only Memory
CDMA Code Division Multiple Access
CINR Carrier to Interference Plus Noise Ratio
CIR Carrier-to-Interference Ratio
Eb/No Energy per Bit to Noise Power Spectral Density Ratio
GIS Geographic/Geographical/Geospatial Information System
GPRS General Packet Radio Service
GSM Global System for Mobile communications: originally from Groupe Special Mobile
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple-Input and Multiple-Output
PC Personal Computer
PCS Personal Communications Service
PDA Personal Digital Assistant
RAM Random Access Memory
ROM Read Only Memory
SINR Signal to Interference Plus Noise Ratio
SIR Signal-to-Interference Ratio
TDMA Time Division Multiple Access
UMTS Universal Mobile Telecommunications Systems Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, WiMax, LTE, and the like. In some embodiments, radio 117 might also facilitate other types of wireless communications including Wi-Fi communications and GIS communications. As can be appreciated, in various embodiments, radio 117 can be configured to support multiple technologies and/or multiple radios can be utilized to support a technology or multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention facilitate selection of a wireless telecommunications network for utilization by a user device. Utilizing embodiments hereof, powers associated with multiple signals received by a user device via multiple channels can be assessed to facilitate selection of a wireless telecommunications network to be used by the user device. As described below, in a MIMO-enabled network, multiple signals are received via antennas at a user device using multiple channels. By comparing powers associated with such signals, an assessment or determination of proximity of the user device to the tower and/or signal strength provided using the MIMO-enabled network can be made. In cases that an undesired connection occurs in association with the MIMO-enabled network (e.g., distant communication connection with the tower and/or poor signal strength), the user device may utilize another network.

By way of example only, assume a user device utilizing a MIMO-enabled network, such as LTE, is positioned at the edge of a coverage area. Further assume that the user device located at that position attains 50 kilobits per second of throughput. As the user device is located at the edge of the coverage area thereby resulting in a lower throughput, another network, such as a CDMA network (e.g., CDMA2000), may provide more optimal performance for the user device based on the user device's location. For instance, CDMA may allow the user device to incur a data rate of 1.4 megabits per second as compared to the 50 kilobits per second realized using the LTE network. In this situation, utilization of CDMA would improve user experience due to the increased throughput as well as improve user experience for others using the MIMO-enabled network as less LTE network capacity would be utilized. In implementation, the user device may recognize an undesired connection associated with the MIMO-enabled network using multiple powers associated with multiple signals received by the user device via multiple channels. Based on recognition of such an undesired connection, the user device may proceed to establish a connection using another network, such as CDMA.

Accordingly, in one aspect, the present invention is directed to one or more computer-readable media having computer-executable instructions embodied thereon that, when executed, perform a method for facilitating selection of networks. The method includes receiving at a user device a first signal via a first channel of a MIMO-enabled network. A first power associated with the first signal is identified. A second signal via a second channel of the MIMO-enabled network is received, and a second power associated with the second signal is identified. The first power associated with the first channel and the second power associated with the second channel are used to determine an undesired connection of the user device with the MIMO-enabled network.

In another aspect, embodiments of the present invention are directed to one or more computer-readable media having computer-executable instructions embodied thereon that, when executed, perform a method for facilitating selection of networks. The method includes receiving a first signal through a first channel of a MIMO-enabled network via a first antenna of a user device and receiving a second signal through a second channel of the MIMO-enabled network via a second antenna of the user device. A first power associated with the first signal and a second power associated with the second signal are identified. Thereafter, it is determined that the first power and the second power exceed a similarity threshold. Based on the determination that the first power and the second power exceed the similarity threshold, the MIMO-enabled network is utilized for communication.

In yet another aspect, a method for facilitating selection of networks. The method includes receiving a first signal through a first channel of a MIMO-enabled network via a first antenna of a user device and identifying a first power associated with the first signal. The method also includes receiving a second signal through a second channel of the MIMO-enabled network via a second antenna of the user device and identifying a second power associated with the second signal. The first power and the second power are used to determine a power ratio. Thereafter, a determination is made as to whether the power ratio exceeds a threshold. When the power ratio exceeds the threshold, the MIMO-enabled network is selected for use by the user device. By contrast, when the power ratio fails to exceed the threshold, an alternative network is selected for use by the user device.

Figure 2:
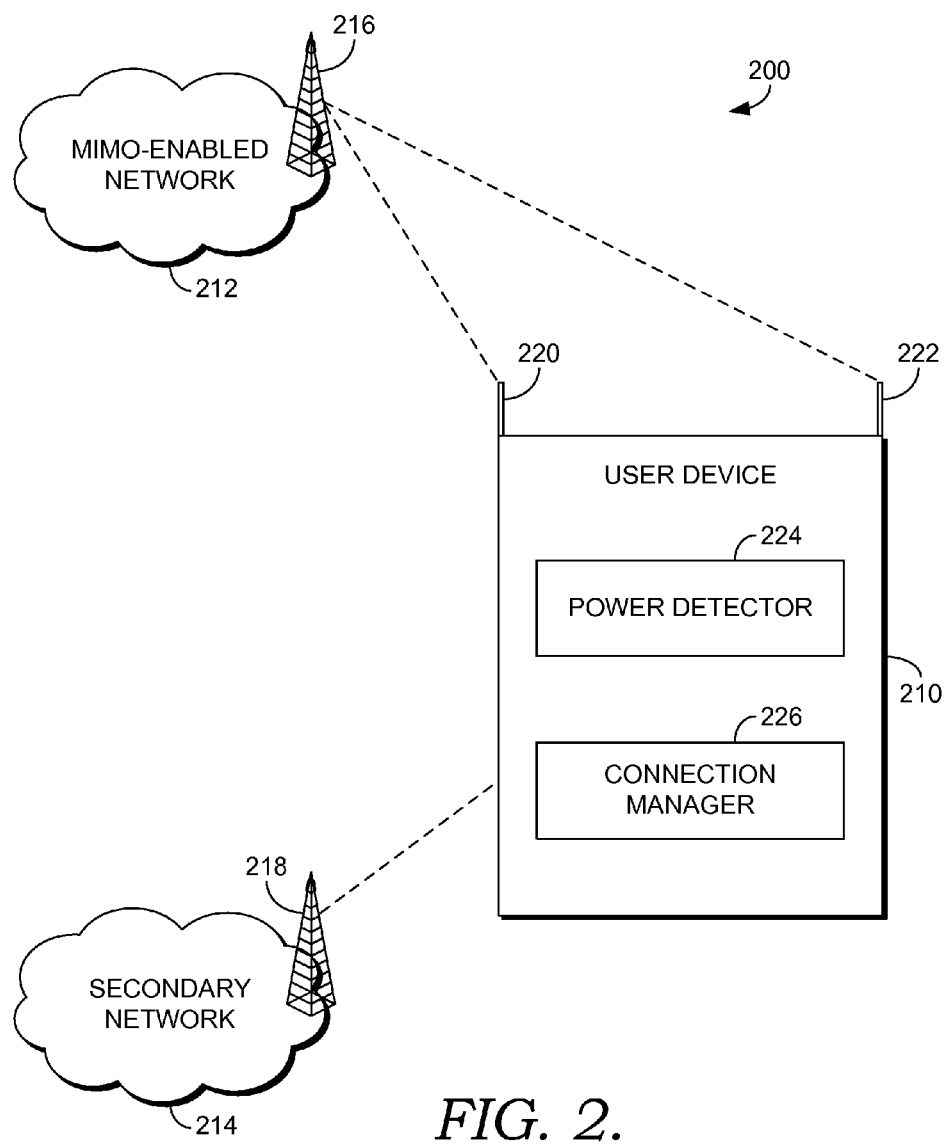
FIG. 2 is a schematic view of an exemplary communications environment suitable for use in implementing embodiments of the present invention.

Turning now to FIG. 2, an exemplary network environment suitable for use in implementing embodiments of the present invention is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a user device 210 may communicate with another device (not shown) via a network(s). The user device 210 may take on a variety of forms, such as a personal computer (PC), a laptop computer, a tablet, a mobile phone, a personal digital assistant (PDA), or any other device that is cable of communicating with other devices. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device is a wireless or mobile device with which a wireless telecommunications network is utilized for communication (e.g., voice and/or data communication). In this regard, the user device communicates with other devices using a wireless telecommunications network(s).

The user device 210 is capable of communicating via a network(s), such as MIMO-enabled network 212 and secondary network 214. Each of networks 212 and 214 might be a single network or multiple networks, as well as being a network of networks. In embodiments, each of networks 212 and 214 is or includes a wireless network (e.g., a wireless telecommunications network). A wireless telecommunications network refers to any type of telecommunications network that is wireless. Examples of wireless telecommunications technologies include, but are not limited to, Global System for Mobile Communications (GSM), General Packet Radio Service (GPRS), Code Division Multiple Access (CDMA), CDMA2000, CDMAOne, Time Division Multiple Access (TDMA), LTE, Universal Mobile Telecommunications Systems (UMTS), Integrated Digital Enhanced Network (iDEN), WiMAX, 3G, 4G, and Personal Communications Service (PCS). A wireless telecommunications network might include an array of devices. Components such as a base station, a communications tower, or even access points (as well as other components) can provide wireless connectivity in some embodiments.

The user device 210 may utilize a MIMO-enabled network 212 to communicate by way of base transceiver station 216. A MIMO-enabled network 212 may be any type of network that enables use of MIMO technology or a MIMO implementation. MIMO or multiple-input and multiple-output is the use of multiple antennas at both the transmitter and receiver to improve communication performance. MIMO technology can provide increases in data throughput and link range without requiring additional bandwidth or transmit power. As MIMO technology can be incorporated in a variety of networks, such as Wi-Fi, 4G, LTE, and WiMAX, the MIMO-enabled network 212 may comprise any such networks (e.g., Wi-Fi, 4G, LTE, and WiMAX).

Alternatively or additionally, the user device 210 may utilize a secondary network 214 to communicate by way of base transceiver station 218. A secondary network may be any type of network that enables a user device(s) to communicate. For example, the secondary network 212 may be Global System for Mobile Communications (GSM), General Packet Radio Service (GPRS), Code Division Multiple Access (CDMA), CDMA2000, CDMAOne, Time Division Multiple Access (TDMA), LTE, Universal Mobile Telecommunications Systems (UMTS), Integrated Digital Enhanced Network (iDEN), WiMAX, 3G, 4G, and Personal Communications Service (PCS).

In embodiments, the MIMO-enabled network 212 is the primary network used by the user device 210 while the secondary network 214 is the secondary network used by the device. That is, the MIMO-enabled network 212 is generally used by the user device 210, but the secondary network 214 may be used in various circumstances, such as unavailability of the MIMO-enabled network or poor network conditions associated with the MIMO-enabled network. By way of example only, the user device 210 may connect or attach to a LTE network when the LTE network is available (e.g., enough power exists to decode a signal(s)). However, when the user device is moved to an edge of the LTE coverage thereby resulting in poor signal performance, the user device may connect or attach to a CDMA network (or other network) providing stronger network conditions.

The base transceiver station 216 associated with the MIMO-enabled network 212 and the base transceiver station 218 associated with the secondary network 214 transmit and receive radio signals. In embodiments, the base transceiver stations 216 and 218 include a transceiver(s), an antenna(s), and equipment for encrypting and decrypting communications with a base station controller (BSC) (not shown). The base transceiver stations 216 and 218 can include any number of antennas (not shown). In embodiments, the base transceiver station 216 associated with MIMO technology includes a plurality of antennas. Although base transceiver station 216 and base transceiver station 218 are illustrated in FIG. 2 as positioned remotely from one another, any number of configurations can be implemented. For instance, antennas associated with a MIMO-enabled network and antenna(s) associated with a secondary network might be co-located at a single base transceiver station. In this regard, the base transceiver station 216 might include antennas capable of supporting a MIMO-enabled network (e.g., LTE) as well as an antenna(s) capable of supporting a secondary network (e.g., CDMA). As can be appreciated, antennas associated with the base transceiver stations 216 and 218 can be internal or external to the base transceiver station.

In operation, the base transceiver station 216 associated with the MIMO-enabled network 212, provides signals via multiple antennas (also referred to herein as MIMO antennas). Such antennas or MIMO antennas refer to antennas that operate using MIMO technology. The signals are received at the user device 210. In embodiments, a first signal(s) is received at a first antenna 220 of the user device 210 via a first channel, and a second signal(s) is received at a second antenna 222 of the user device 210 via a second channel. A channel refers to a communication channel used to convey signals, such as a radio channel. A channel capacity and/or performance may be measured in any number of ways, such as bandwidth, data rate, Eb/No, SINR, SIR, CIR, and/or the like.

Upon receiving signals from the base transceiver station 216 via the first antenna 220 through the first channel and the second antenna 222 through the second channel, the user device 210 can facilitate recognition of a desired or an undesired connection associated with the MIMO-enabled network 212. In this regard, a power detector 224 of user device 210 is used to detect power associated with signals received via channels using the antennas on the user device. In implementation, the power detector 224 can detect, identify, or recognize power for a signal(s) received through each channel via the antenna(s). As such, embodiments of the present invention analyze signals received at the user device via multiple channels. Power, as used herein, refers to signal strength.

Power can be measured or represented, for example, using Eb/No, SINR, CINR, or any power determining techniques used to determine carrier signal strength for instance.

Upon determining powers associated with signals received at a user device via multiple channels, a connection manager 226 of the user device 210 can identify, determine, or recognize to which network, or portion thereof (e.g., base transceiver station) to connect or attach. In this regard, the connection manager 226 can facilitate network selection for radio attachment. In embodiments, the connection manager 226 compares each of the powers associated with multiple channels through which signals for a particular network are received at the user device. By way of example, a first power associated with a signal(s) received at the user device through a first channel corresponding with the MIMO-enabled network 212 is compared to a second power associated with a signal(s) received at the user device through a second channel corresponding with the MIMO-enabled network 212.

In some cases, a comparison may be performed by calculating or determining a ratio of the powers of signals received at the user device through multiple channels associated with a MIMO-enabled network (e.g., Power 1/Power 2). Generally, as the user device 210 moves further away from the base transceiver station 216, the ratio between the powers associated with the MIMO antennas of the user device 210 changes. In this regard, the ratio of powers associated with the MIMO antennas 220 and 222 on the user device 210 scales (e.g., proportionally) with distance of the user device from the base transceiver station 216. When the user device 210 is positioned sufficiently far away from the base transceiver station 216 (e.g., edge of coverage area), the power associated with a first channel and a power associated with a second channel become approximately equal. As such, a power ratio will generally be closer to one. By contrast, when the user device 210 is positioned closer to the base transceiver station 216, a signal to noise variation exists that does not generally occur when the user device is positioned at a further distance from the base transceiver station 216, for example, due to frequency and multi-path technology.

In such an implementation, upon determining a power ratio (e.g., a power associated with a signal(s) received via a first channel divided by a power associated with a signal(s) received via a second channel), it can be determined whether the power ratio exceeds a threshold or is within a threshold (e.g., a power-ratio threshold). If the power ratio falls within a threshold (e.g., within an absolute value from one), it can be determined that an undesired connection is occurring or will occur in association with the user device. That is, when a power ratio falls within a threshold, a determination can be made in association with proximity of the user device to a base transceiver (e.g., the user device is located at or near a coverage edge or boundary), a poor signal strength, or the like. By contrast, when the power ratio exceeds a threshold (e.g., exceeds an absolute value from one), a determination can be made that a desired connection is occurring or will occur in association with the MIMO-enabled network.

Any number of implementations can be utilized to compare the powers of received signals associated with various channels. For example, a direct comparison of the powers can be employed and the distance between the powers analyzed (e.g., does it exceed a threshold). In this regard, a power associated with a signal received via a first channel can be directly compared to a power associated with a signal received via a second channel. If the powers are within a threshold of one another, it can be determined that an undesired connection has or will be experienced. For instance, when the powers of signals associated with different channels or antennas are nearly the same or approximately equal, the user device can be deemed to be receiving poor signal strength or be positioned near a coverage boundary.

In cases that an undesired connection in association with the MIMO-enabled network 212 is determined to be established (e.g., the base transceiver station 216 is at a distance or poor signal strength is detected), an alternative network, such as secondary network 214, may be deemed a better solution for user device communication. As such, the connection manager 226 can be configured to facilitate selection of a network for utilization.

In some cases, merely exceeding or falling within a threshold may result in selection to utilize an alternative network. For example, when a power ratio is determined to be nearly equal to one or the powers associated with multiple channels are determined to be similar to one another, utilization of an alternative network, such as secondary network 214, may be selected.

In other cases, upon determining that an undesired connection is established by exceeding or falling within a threshold, a power(s) associated with an alternative network(s) may be analyzed to determine which network to utilize. In this regard, power associated with a signal received from a channel corresponding with an alternative network may be analyzed to determine which network to utilize. For example, if power associated with a signal received by the user device 210 via a channel corresponding with the secondary network 214 is greater than the power associated with the MIMO-enabled network; exceeds a power-difference threshold (e.g., power difference between the MIMO-enabled network and secondary network), or exceeds a power threshold associated with the secondary network, the secondary network 214, or a portion thereof (e.g., base transceiver station 218) can be selected for communication.

Figure 3:
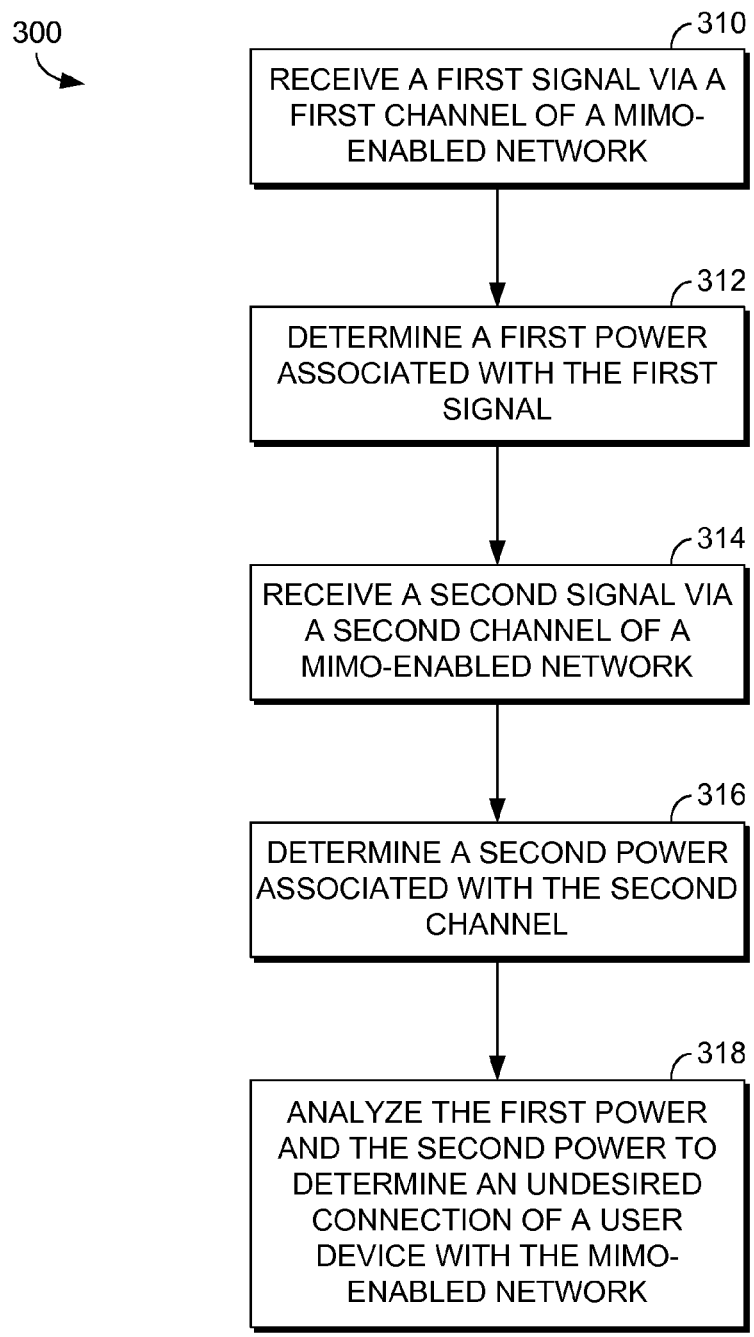
FIG. 3 provides an exemplary first method for facilitating selection of a communications network, in accordance with an embodiment of the present invention.

With reference to FIG. 3, a flow diagram is shown illustrating a method 300 for facilitating selection of a communication network, in accordance with an embodiment of the present invention. In embodiments, method 300 can be performed at a user device, such as user device 210 of FIG. 2. Initially, as indicated at block 310, a first signal is received via a first channel of a MIMO-enabled network. Thereafter, a first power associated with the first signal is determined, as indicated at block 312. At block 314, a second signal is received via a second channel of a MIMO-enabled network. Thereafter, a second power associated with the second signal is determined, as indicated at block 316. As can be appreciated, the first signal and the second signal can be received approximately concurrently or close in time. At block 318, the first power and the second power are analyzed to determine an undesired connection of a user device with the MIMO-enabled network. In this regard, an undesired connection may be deemed when the powers are relatively close to one another. As such, the power values may be within a threshold value of one another or a power ratio of the values may be within a threshold value from one indicating that the powers are nearly the same relative to one another.

Figure 4:
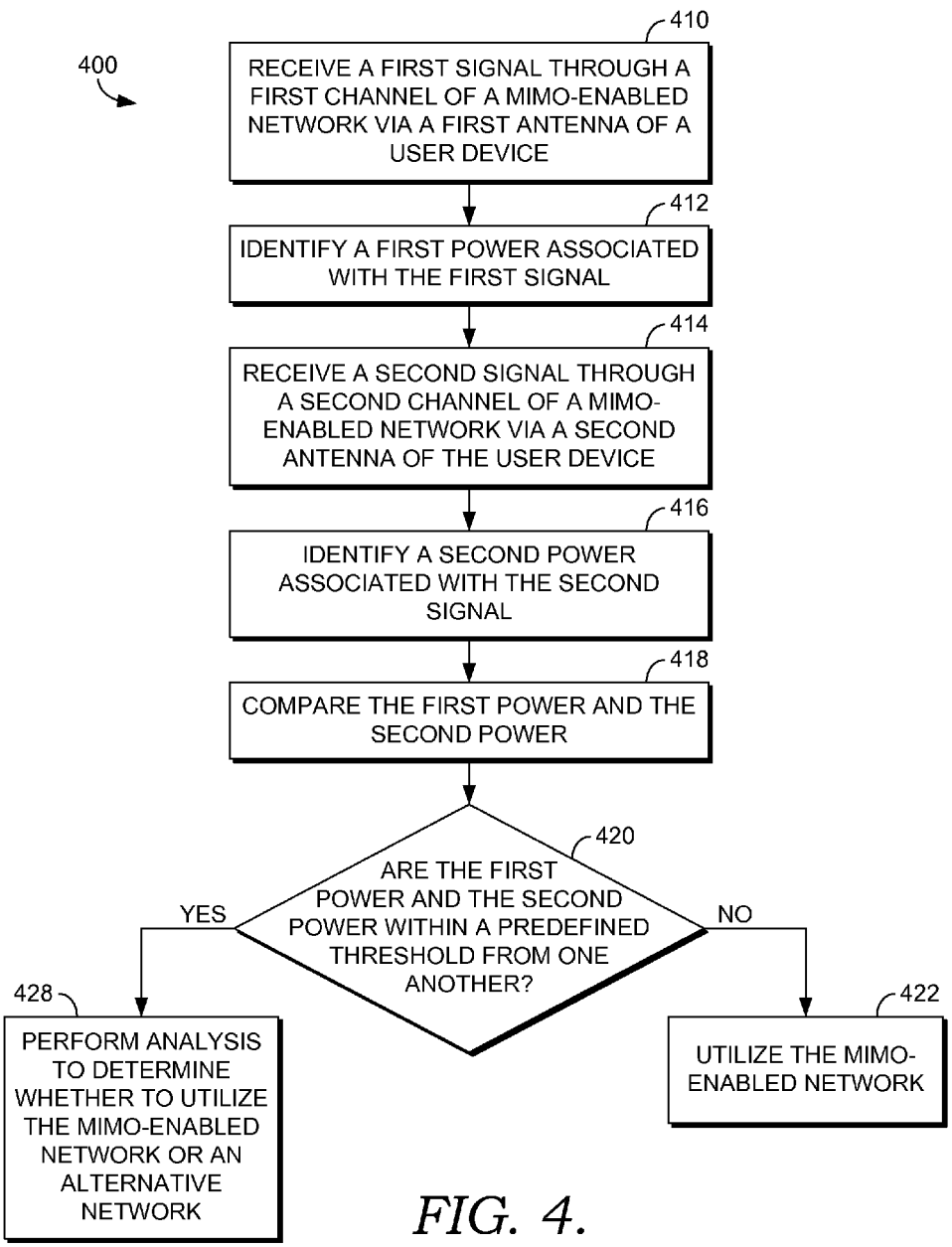
FIG. 4 provides an exemplary second method for facilitating selection of a communications network, in accordance with an embodiment of the present invention.

Turning now to FIG. 4, a flow diagram is shown illustrating a method 400 for facilitating selection of a communication network, in accordance with an embodiment of the present invention. In embodiments, method 400 can be performed at a user device, such as user device 210 of FIG. 2. Initially, as indicated at block 410, a first signal is received through a first channel of a MIMO-enabled network via a first antenna of a user device. Thereafter, a first power associated with the first signal is identified, as indicated at block 412. At block 414, a second signal is received through a second channel of a MIMO-enabled network via a second antenna of a user device. Thereafter, a second power associated with the second signal is identified, as indicated at block 416. At block 418, the first power is compared to the second power.

As indicated at block 420, a determination is made as to whether the first power and the second power are within a predefined threshold from one another. If the powers are not within a predefined threshold from one another, the MIMO-enabled network is utilized, as indicated at block 422. On the other hand, if the powers are within a predefined threshold from one another (e.g., power values are near one another indicating the user device is at a coverage edge), at block 424, an analysis is performed to determine whether to utilize the MIMO-enabled network or an alternative network. Various types of analysis may be performed to make such a determination. For instance, the power(s) associated with the MIMO-enabled network may be compared to the power(s) associated with an alternative network(s). In another embodiment, the power(s) associated with an alternative network may be compared to a threshold associated with an alternative network to determine whether to utilize the alternative network.

Figure 5:
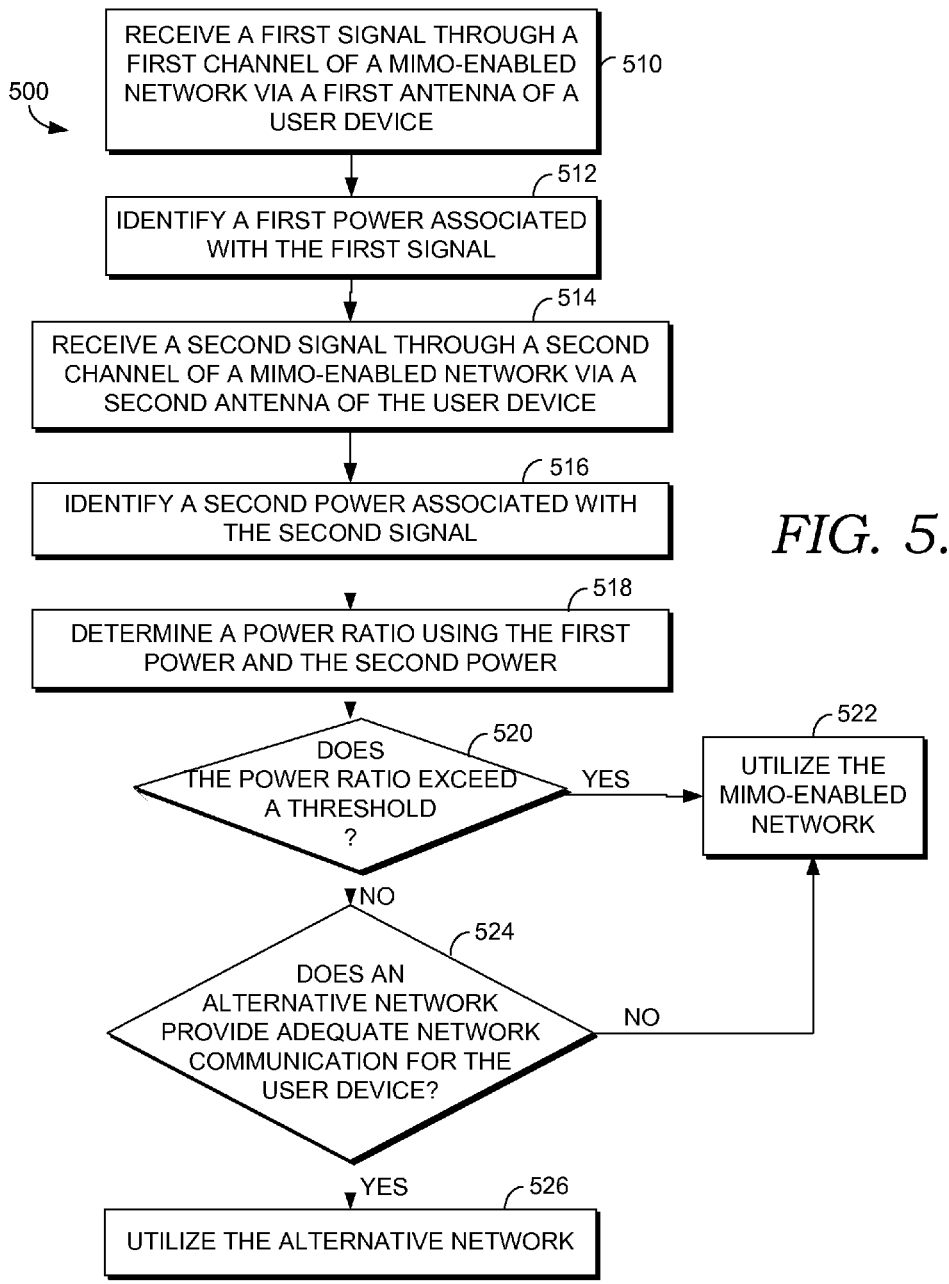
FIG. 5 provides an exemplary third method for facilitating selection of a communications network, in accordance with an embodiment of the present invention.

Referring now to FIG. 5, a flow diagram is shown illustrating a method 500 for facilitating selection of a communication network, in accordance with an embodiment of the present invention. In embodiments, method 500 can be performed at a user device, such as user device 210 of FIG. 2. Initially, as indicated at block 510, a first signal is received through a first channel of a MIMO-enabled network via a first antenna of a user device. Thereafter, a first power associated with the first signal is identified, as indicated at block 512. At block 514, a second signal is received through a second channel of a MIMO-enabled network via a second antenna of a user device. Thereafter, a second power associated with the second signal is identified, as indicated at block 516.

At block 518, a power ratio is determined using the first power and the second power. Subsequently, at block 520, a determination is made as to whether the power ratio exceeds a threshold. If the power ratio exceeds a threshold (e.g., power ratio is greater than an absolute value from one), the MIMO-enabled network is utilized, as indicated at block 522. On the other hand, if the power ratio does not exceed a threshold, at block 524, it is determined whether an alternative network provides adequate network communication for the user device. If not, the MIMO-enabled network is utilized, as indicated at block 522. If an alternative network does provide adequate network communication, the alternative network is selected for utilization, as indicated at block 526. As previously described, determining whether an alternative network provides adequate network communication may occur in any manner. For instance, the power(s) associated with the MIMO-enabled network may be compared to the power(s) associated with an alternative network(s). In another embodiment, the power(s) associated with an alternative network may be compared to a threshold associated with an alternative network to determine whether to utilize the alternative network.

It will be understood by those of ordinary skill in the art that the order of steps shown in the method 400 of FIG. 4, method 500 of FIG. 5, and method 600 of FIG. 6 are not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below.

Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable storage media having computer-executable instructions embodied thereon that, when executed, perform a method for facilitating selection of networks, the method comprising:
   receiving at a user device a first signal via a first channel from a base transceiver station (BTS) of a MIMO-enabled network;
   identifying a first signal power associated with the first signal received from the BTS;
   receiving at the user device a second signal via a second channel from the BTS of the MIMO-enabled network;
   identifying a second signal power associated with the second signal received from the BTS;
   comparing the first signal power with the second signal power; based on the comparison of the first signal power and the second signal power, determining a measure of closeness between the first signal power and the second signal power;
   when the measure of closeness between the first signal power and the second signal power falls within a threshold, then determining that a connection with the base transceiver station is using the first power associated with the first channel and the second power associated with the second channel to determine an undesired connection of the user device with the MIMO-enabled network.

2. The media of claim 1, wherein the first signal power and the second signal power are within a threshold value of one another.

3. The media of claim 1, wherein the determination of the undesired connection of the user device with the MIMO-enabled network is based on a power ratio of the first power and the second power.

4. The media of claim 3, wherein the power ratio is within a threshold value of one.

5. The media of claim 1, wherein the first signal is received through a first antenna of the user device and the second signal is received though a second antenna of the user device.

6. One or more non-transitory computer-readable storage media having computer-executable instructions embodied thereon that, when executed, perform a method for facilitating selection between a MIMO-enabled network and an alternative network, the method comprising:
   receiving a first signal from a base transceiver station (BTS) through a first channel of a MIMO-enabled network via a first antenna of a user device;
   identifying a first signal power associated with the first signal;
   receiving a second signal from the BTS through a second channel of the MIMO-enabled network via a second antenna of the user device;
   identifying a second signal power associated with the second signal; based on a comparison of the first signal power and the second signal power;
   determining that the first signal power and the second signal power exceed a similarity threshold; and
   based on the determination that the first power and the second power exceed the similarity threshold, selecting and utilizing the MIMO-enabled network for communication rather than the alternative network.

7. The media of claim 6, wherein the similarity threshold comprises a maximum value of the difference between the first power and the second power.

8. The media of claim 6, wherein the first power and the second power comprise a value associated with energy per bit to noise power spectral density ratio (Eb/No), signal to interference plus noise ratio (SINR), signal-to-interference ratio (SIR), carrier-to-interference ratio (CIR), carrier to interference plus noise ratio (CINR), or a combination thereof.

9. The media of claim 6, wherein the first antenna and the second antenna are spaced a distance apart on the user device.

10. The media of claim 6, wherein the first signal and the second signal are received substantially concurrently with one another.

11. The media of claim 6, wherein the MIMO-enabled network comprises a long term evolution (LTE) network.

12. The media of claim 6, wherein the MIMO-enabled network comprises a 4G network that utilizes multiple-in and multiple-out technology.

13. A method for facilitating selection of networks, the method comprising:
    receiving a first signal through a first channel of a MIMO-enabled network via a first antenna of a user device;
    identifying a first power associated with the first signal;
    receiving a second signal through a second channel of the MIMO-enabled network via a second antenna of the user device;
    identifying a second power associated with the second signal;
    using the first power and the second power to determine a power ratio;
    determining whether the power ratio exceeds a threshold, wherein
        when the power ratio exceeds the threshold, selecting the MIMO-enabled network for use by the user device, and
        when the power ratio fails to exceed the threshold, selecting an alternative network for use by the user device.

14. The method of claim 13, wherein the first power and the second power comprise a value associated with energy per bit to noise power spectral density ratio (Eb/No), signal to interference plus noise ratio (SINR), signal-to-interference ratio (SIR), carrier-to-interference ratio (CIR), carrier to interference plus noise ratio (CINR), or a combination thereof.

15. The method of claim 13, wherein the MIMO-enabled network comprises a long term evolution (LTE) network.

16. The method of claim 15, wherein the alternative network comprises a code division multiple access (CDMA) network.

17. The method of claim 13, wherein the alternative network comprises a network that does not utilize MIMO technology.

18. The method of claim 13, wherein the threshold comprises an absolute value of variance from one.

19. The method of claim 13, wherein the power ratio comprises the first value divided by the second value or the second value divided by the first value.

\* \* \* \* \*